Dec. 16, 1930.  F. C. COWBURN  1,785,617
ROLLER BEARING
Filed Nov. 5, 1928
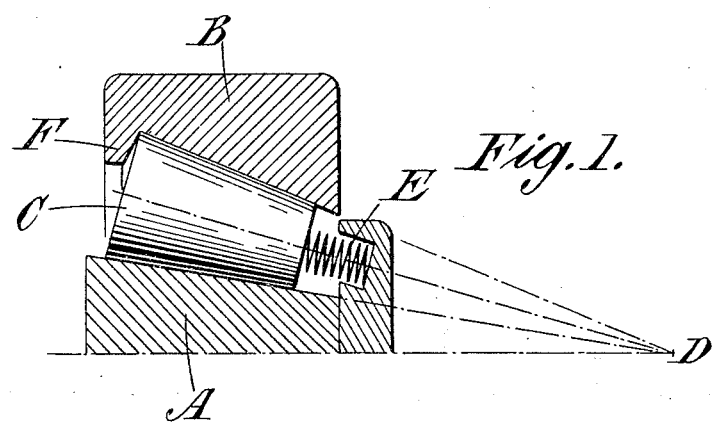
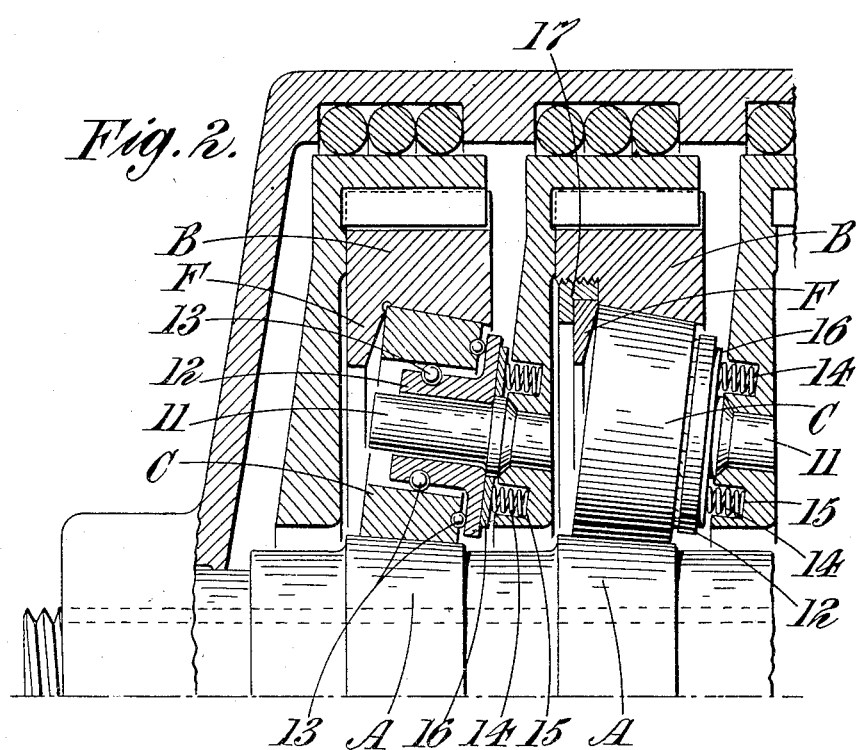
Inventor
F. C. Cowburn
Atty.

Patented Dec. 16, 1930

1,785,617

UNITED STATES PATENT OFFICE

FREDERICK CAMERON COWBURN, OF GOSPORT, ENGLAND

ROLLER BEARING

Application filed November 5, 1928, Serial No. 317,257, and in Great Britain November 25, 1927.

This invention has relation to roller bearings and the like, and is also applicable to epicyclic gearing of the friction roller type.

The invention has reference to roller bearings and the like of the kind in which the inner and outer races and the rollers are conical.

The invention has for its object to ensure that the three members of the bearing always tend to assume a position in which they have a common apex.

The present invention comprises the combination with roller bearings and the like of the kind herein referred to and wherein the outer race and the rollers are capable of movement longitudinally in relation to the inner race, of an abutment integral with or mounted on the outer race to contact with the broad ends of the rollers and means to apply end thrust to the rollers in a direction to force their broad ends into contact with the abutment.

In order that the invention, the nature of which has been set forth, may be particularly described and ascertained, reference will now be made to the accompanying sheet of drawings, on which:—

Fig. 1 illustrates diagrammatically the invention in its simplest form; and

Fig. 2 is a longitudinal sectional view of epicyclic gearing embodying the invention.

Referring to Fig. 1,

A is the inner race which is mounted on its shaft or carrier so as to be incapable of rotary and longitudinal movement in relation thereto. B is the outer race which is mounted so that it can move both in a rotary sense and longitudinally in relation to the inner race A. C is one of a set of rollers interposed between the races A and B. The races A, B are conical and the rollers C are frustro-conical and all have a common apex D. The rollers C are subject to end thrust, as by a spring E, applied to the small ends thereof. The outer race B has an abutment F around that edge to which the broad ends of the rollers C are directed. The thrust on the small ends of the rollers C is transmitted through the abutment F to the outer race B so that the rollers C and outer race B move together longitudinally in relation to the inner race A, until the rollers C are in running contact with both races.

Referring now to Fig. 2,

A, B, C, are respectively, the inner race, the outer race and one of a set of rollers, all as described with references to Fig. 1. The rollers C are each mounted on a pin 11 through the intermediary of a flanged sleeve 12 and ball bearings 13. 14, 14 are springs contained in pockets 15 and bearing through a plate 16 on the flanged sleeve 12. By the springs 14 and end thrust is applied to the rollers C and this end thrust is transmitted through the abutment F to the outer race B, which, together with the rollers C is moved longitudinally in relation to the inner race A until the rollers C are in running contact with the races A and B. In the left-hand portion of Fig. 2, the abutment F is shown as integral with the outer race B. The face of the abutment F opposite the ends of the rollers C is chamfered.

In the right-hand portion of Fig. 2, the abutment is constituted of a ring F chamfered on the face adjacent the broad ends of the rollers C. The ring F is contained within a carrier 17 screwed into the outer race B. The ring F is rotatable in its mounting.

What I claim is:—

1. The combination with roller bearings and the like of the kind herein referred to, and wherein the outer race and the rollers are capable of movement longitudinally together in relation to the inner race, of an abutment on the movable outer race to contact with the broad ends of the rollers and means to apply and thrust to the rollers in a direction to force their broad ends into contact with the abutment.

2. Roller bearings and the like of the kind herein referred to as claimed in claim 1, wherein the abutment comprises a ring mounted in the outer race so as to be rotatable in relation thereto.

3. Roller bearings and the like of the kind herein referred to, the combination of an inner race, tapered rollers having a bearing on said race and an outer annular floating race embracing the outer peripheries of the said rollers and bearing thereon and an abutment on said race against which the rollers engage whereby the rollers and the floating race are longitudinally movable.

4. A roller bearing and the like of the kind herein referred to, the combination of an inner tapered race, roller bearings correspondingly tapered and engaging the inner race, an outer annular floating race tapered to correspond to the taper of the rollers and engaging the outer bearing of said rollers, the outer floating race having an abutment against which the large ends of the rollers engage, and means for pressing the said rollers in a direction toward their large ends.

5. In a roller bearing and the like, the combination of an inner tapered race, tapered rollers engaging the said race and an outer annular floating race tapered to correspond with the taper of the rollers and in engagement with their outer peripheries, means pressing the said rollers in the direction of their larger ends, said floating race having an abutment in engagement adjacent their outer peripheries.

6. The combination with roller bearings and the like of the kind herein refered to, and wherein the outer race and the rollers are capable of movement longitudinally in relation to the inner race, of an abutment on the outer race to contact with the rollers and means to apply end trust to the rollers in a direction to force them into contact with the abutment.

Dated this 23rd day of October, 1928.

FREDERICK CAMERON COWBURN.